(12) United States Patent
Bavelloni

(10) Patent No.: US 7,431,046 B2
(45) Date of Patent: Oct. 7, 2008

(54) PNEUMATIC DEVICE FOR CONTINUOUSLY VARYING THE PRESSURE OF COMPRESSED AIR

(75) Inventor: Franco Bavelloni, San Fermo Della Battaglia (IT)

(73) Assignee: Z. Bavelloni S.p.A., Bregnano (IT)

( * ) Notice: Subject to any disclaimer, the term of this patent is extended or adjusted under 35 U.S.C. 154(b) by 180 days.

(21) Appl. No.: 11/246,108

(22) Filed: Oct. 11, 2005

(65) Prior Publication Data

US 2006/0093487 A1    May 4, 2006

(30) Foreign Application Priority Data

Nov. 4, 2004 (IT) .......................... MI2004A2116

(51) Int. Cl.
*F04B 49/06* (2006.01)
(52) U.S. Cl. .................................. 137/487.5
(58) Field of Classification Search ................... 137/14, 137/478.5, 487.5
See application file for complete search history.

(56) References Cited

U.S. PATENT DOCUMENTS

| 4,086,804 A | | 5/1978 | Ruby et al. | |
|---|---|---|---|---|
| 4,724,865 A | * | 2/1988 | Hirano et al. | ................ 137/486 |
| 4,791,954 A | * | 12/1988 | Hasegawa | ................ 137/487.5 |
| 6,178,997 B1 | | 1/2001 | Adams et al. | |
| 2002/0117212 A1 | | 8/2002 | Vyers et al. | |

* cited by examiner

*Primary Examiner*—Kevin L Lee
(74) *Attorney, Agent, or Firm*—Modiano & Associati; Albert Josif; Daniel J. O'Byrne

(57) ABSTRACT

A pneumatic device for continuously varying the pressure of compressed air for feeding pneumatic actuators, comprising a pressure regulation device, which is adapted to receive in input an unregulated pressure line and to provide in output a regulated pressure; an error amplifier, which is adapted to drive an actuation device, which in turn is adapted to actuate the pressure regulation device; and a pressure transducer, which is adapted to detect a pressure value downstream of the pressure regulation device and to feed it back to the error amplifier, for closed-loop control of the pressure regulation device.

3 Claims, 1 Drawing Sheet

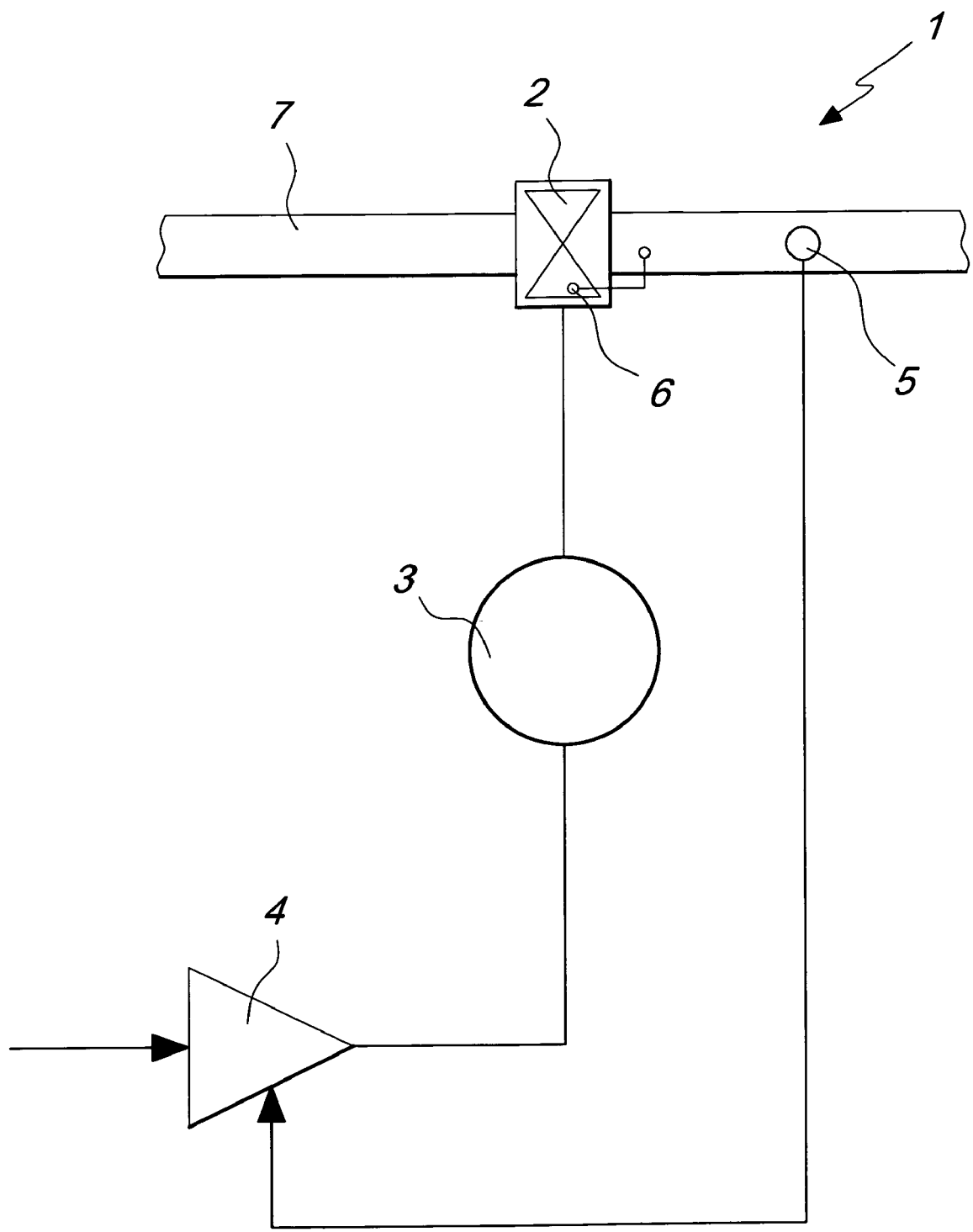

PNEUMATIC DEVICE FOR CONTINUOUSLY VARYING THE PRESSURE OF COMPRESSED AIR

The present invention relates to a pneumatic device for continuously varying the pressure of air. More particularly, the invention relates to a pneumatic device for achieving a continuous variation of the pressure of compressed air in order to supply a plurality of pneumatic actuators arranged at a distance from said pneumatic device.

BACKGROUND OF THE INVENTION

As is known, in several cases it is necessary to use compressed air in order to operate actuators in machines of the automatic type. Control of the mechanical action of these actuators is usually performed by resorting to pressure regulation valves.

If the need to vary the pressure is continuous and is part of an automatic cycle, it is usual to use electronically controlled proportional electric valves.

Substantially, the operating principle consists in generating a magnetic force, which is proportional to the deviation between the pressure set point and the output pressure detected with an appropriate transducer arranged internally, which is compensated by a return force, which is generated by the selected output pressure and can be varied at will.

These elements, which are usually commercially available and are provided by various manufacturers, have immediate response times, limited hysteresis of the control system, and high sensitivity.

However, if a continuous variation of the pressure of the compressed air is required in order to supply a plurality of automatic actuators which perform different functions and are variously distributed on the machine with considerable distances between the regulation point and the actuator, for example more than 8 meters, conventional solutions are not satisfactory.

Due to the high compressibility of compressed air and to the elasticity of the system, which is generally provided by means of plastic hoses, with consequent continuous changes to the overall volume and to the propagation time, the use of electronically-controlled proportional electric valves, which have immediate response times and in which the pressure transducer for controlling the output pressure is arranged inside them, i.e., at a considerable distance from the point of use, has drawbacks due to the offset between the actual pressure in the two adjustment and utilization points.

In order to prevent this offset from interfering with the correct operation of the actuator, it is necessary to wait for the system to stabilize by introducing a delay time between the regulation command and the command of the actuator, which must be determined experimentally for each actuator, or by varying gradually the set point of the proportional electric valve in order to be certain that the two pressures are equivalent at all times.

The times of the operating cycle of the machine are of course affected negatively by the phenomena described above and by the consequent attenuation methods.

Another solution for reducing this phenomenon might consist in reducing drastically the proportional gain of the regulator arranged inside the proportional electric valve, but this is practically unfeasible due to the limited sensitivity of the regulation system.

SUMMARY OF THE INVENTION

The aim of the present invention is to provide a pneumatic device for continuously varying the pressure of compressed air, particularly for driving a plurality of pneumatic actuators, which allows to achieve pressure regulation with two parallel regulation loops.

Within this aim, an object of the present invention is to provide a pneumatic device for achieving a continuous variation of the pressure of compressed air in which the smaller pressure differences can be damped more intensely than the greater differences.

Another object of the present invention is to provide a pneumatic device which is substantially free from offset and oscillation of the regulated pressure.

Another object of the present invention is to provide a pneumatic device which is highly reliable, relatively simple to provide, and at competitive costs.

This aim and these and other objects, which will become better apparent hereinafter, are achieved by a pneumatic device for continuously varying the pressure of compressed air for feeding pneumatic actuators, characterized in that it comprises: pressure regulation means, which are adapted to receive in input an unregulated pressure line and to provide in output a regulated pressure; error amplifying means, which are adapted to drive actuation means, which in turn are adapted to actuate said pressure regulation means; and pressure transducer means, which are adapted to detect a pressure value downstream of said pressure regulation means and to feed it back to said error amplifying means, for closed-loop control of said pressure regulation means.

BRIEF DESCRIPTION OF THE DRAWING

Further characteristics and advantages of the invention will become better apparent from the description of a preferred but not exclusive embodiment of the device according to the invention, illustrated by way of non-limiting example in the accompanying FIGURE, which illustrates schematically the device according to the invention.

DESCRIPTION OF THE PREFERRED EMBODIMENTS

With reference to the FIGURE, the pneumatic device according to the present invention, generally designated by the reference numeral 1, comprises means 2 for the automatic mechanical precision regulation of the pressure, which are adapted to receive in input an unregulated pressure line 7 and to provide in output a regulated pressure, and to which actuation means 3 are connected, said actuation means being constituted conveniently for example by a motor which is connected to the setting stem 6 of the pressure regulation means 2. The motor 3 is conveniently a motor for example of the direct-current type with variable speed in both directions, which is supplied with power by error amplifying means 4. There is also an electronic pressure sensor 5, which is separate from the rest of the device and therefore can be positioned at will within the pneumatic system of the machine and sends a pressure signal to the error amplifying means 4.

The pressure sensor 5 is in practice a pressure transducer which constitutes an external feedback regulation loop together with the error amplifying means 4, the motor 3, and the pressure regulator 2.

Substantially, the pneumatic device according to the invention comprises two different regulation loops: a first one, which resides in the regulator 2 and is the internal regulation loop, and a second one, which is the external regulation loop defined earlier.

A pressure set point is sent to the error amplifying means 4, and the amplifier 4 turns the motor 3, which actuates (opens or closes) the pressure regulator 2 until the pressure transducer 5 detects a pressure that is equal to the pressure of the set point.

The rotation rate of the motor 3 is proportional to the difference between the two pressures, and therefore as the pressure detected by the transducer 5 approaches the pressure of the set point, the subsequent pressure variations are increasingly attenuated and therefore the elastic elements of the pneumatic system (compressibility of the air and elasticity of the hoses) have the time to adapt simultaneously.

The compensation system of the regulator also adapts to the continuous new position of the setting stem 6 of the regulator 2, which corresponds to the new regulation pressure, and therefore a pressure regulation system is provided which is composed of the two concentric regulation loops defined above.

The external loop intervenes exclusively during a new set point or if the difference in pressure between the set point and the detected pressure exceeds a preset value in order to reinforce the compensation action of the regulator 2.

The internal loop that resides in the regulator 2 instead starts to intervene when the difference between the pressure at the output of the regulator and the pressure determined by the position of its setting stem 6 exceeds a preset value. Therefore, a mechanism with a high gain which is variable directly according to the amplitude of the pressure difference is analyzed, i.e., the smaller pressure differences are damped more intensely than the greater ones (only the regulator 2 acts), while the greater differences are also compensated by the proportional action of the error amplifying means 4 and of the motor 3. Therefore, the device according to the invention provides a main regulation system (set point=output pressure measured by the transducer 5) and a secondary regulation system (set point=pressure in output from the regulator 2) which is adapted to compress the first pressure variations, which accordingly have a reduced effect on the main regulation system, with an advantage in terms of swiftness of response and stability of the entire system.

The pneumatic device according to the invention, which is substantially free from offsets and oscillations of the regulated pressure, has for example a typical sensitivity of 6 kPa and, outside transients, a maximum variation of the output pressure of less than 1.4 kPa for the regulator 2 that is used and for the following measurement conditions, given by way of example:

regulation range:

| | |
|---|---|
| output pressure | 50 ... 560 kPa (=0.5 ... 5.6 bars = 7.80 psi) | effect of input variations on the output pressure:

| | |
|---|---|
| input pressure | 280 ... 700 kPa (=2.8 ... 7.00 bars = 40.100 psi) |
| output pressure | 69 kPa (=0.7 bars = 10 psi). | effect of flow-rate variations on the output pressure:

| | |
|---|---|
| input pressure | 600 kPa (=6.00 bars = 90 psi) |
| flow-rate | 1 ... 17.0 m³/h |
| output pressure | 344.8 kPa (3.4 bars = 50 psi) |

The use of the pneumatic device according to the invention instead of a proportional valve has the following advantages.

In general, in proportional valves the control and actuation electronics supply power to a solenoid, which generates an electromagnetic force which balances a force determined by the pressure in output. The closed-loop regulation regulates the pressure in output on the basis of the control set point bidirectionally. Instead, in the case of the pneumatic device according to the invention, pressure regulation is performed with two parallel regulation loops:

the internal mechanical loop or circuit, which resides in the pressure regulator, acts unidirectionally for an output pressure that exceeds a preset value with respect to the calibration pressure;

the external electronic loop, which consists of the bidirectional motorization of the mechanical regulator in order to make the pressure indicated by the transducer equal to the set point sent to the amplifier means.

Therefore, the pneumatic device according to the present invention entails improvements as regards the precision of the regulation that is performed.

The arrangement of the pressure transducer 5 of the pneumatic system is unimportant, but preferably it should be arranged proximate to the actuators that use the compressed air at the pressure thus regulated, since in this manner, and particularly in dynamic periods, the actual utilization pressure is controlled constantly.

In practice it has been found that the pneumatic device according to the invention fully achieves the intended aim and objects, since it allows to achieve a continuous variation of the pressure of the compressed air in order to supply a plurality of pneumatic actuators, using two different control loops, one residing in the mechanical regulator and the other one being of the electronic type and being external to the first one.

The device thus conceived is susceptible of numerous modifications and variations, all of which are within the scope of the appended claims; all the details may further be replaced with other technically equivalent elements.

In practice, the materials used, as well as the specific shapes and dimensions, may be any according to requirements and to the state of the art.

The disclosures in Italian Patent Application No. MI2004A002116 from which this application claims priority are incorporated herein by reference.

What is claimed is:

1. A pneumatic device for continuously varying the pressure of compressed air for feeding pneumatic actuators, comprising: pressure regulation means, adapted to receive in input an unregulated air pressure line and to provide in output, in the line, a regulated pressure; drive actuation means, for actuating said pressure regulation means; error amplifying means for driving said actuation means; and pressure transducer means, for detecting a pressure value downstream of said pressure regulation means and for feeding said value back to said error amplifying means, for closed-loop control of said pressure regulation means, wherein said pressure regulation means constitute a first pressure regulation loop and said error amplifying means, said actuation means, said pressure regulation means and said pressure transducer means constitute a second pressure regulation loop, which is external to said first loop, wherein said first and second pressure regulation loop receive in input a single set-point signal that is a pressure set-point value input to said error amplifying means in addition to said pressure value detected by said transducer means.

2. The device according to claim 1, wherein said actuation means comprise a bidirectional DC electric motor, which is connected to a controlling stem of said pressure regulation means.

3. The device according to claim 1, wherein said pressure regulation means comprise a mechanical pressure regulator with an internal compensation circuit.

* * * * *